March 19, 1968

HISAKAZU IKEUCHI 3,373,542

COIN HANDLING APPARATUS

Filed May 18, 1965

H. IKEUCHI
INVENTOR

March 19, 1968

HISAKAZU IKEUCHI 3,373,542

COIN HANDLING APPARATUS

Filed May 18, 1965

H. IKEUCHI
INVENTOR

BY
ATTORNEYS

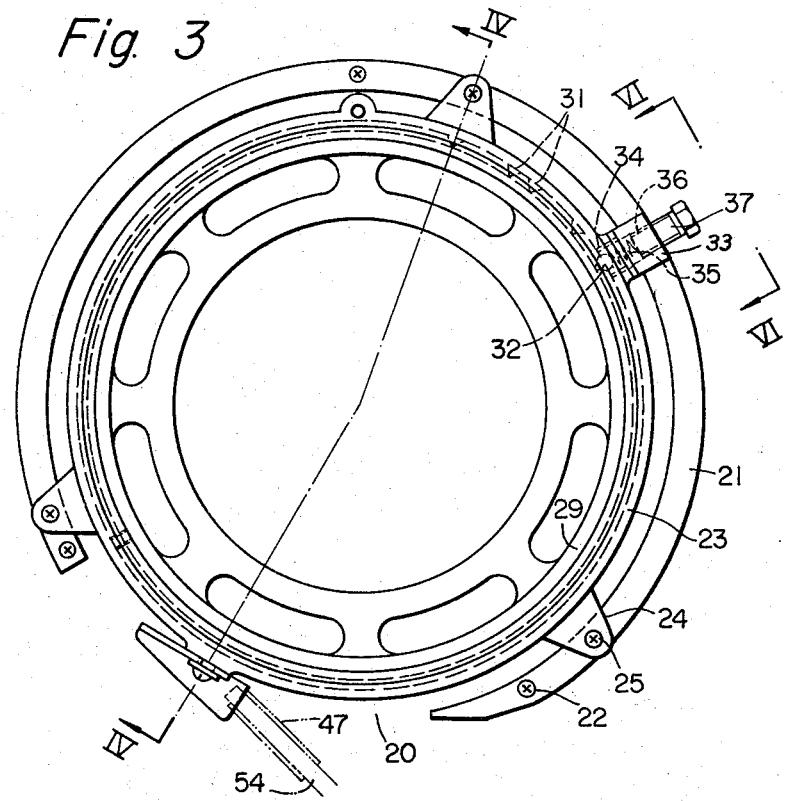
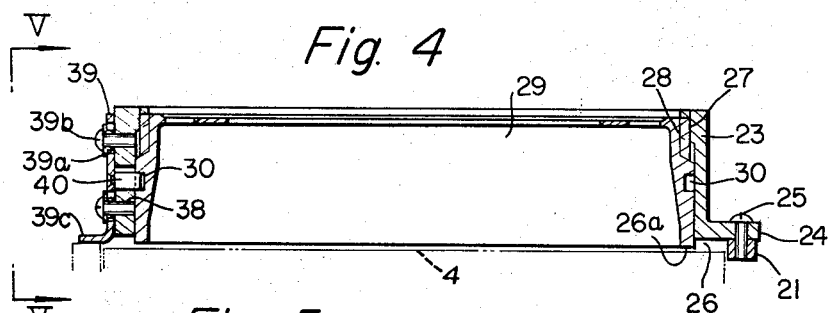
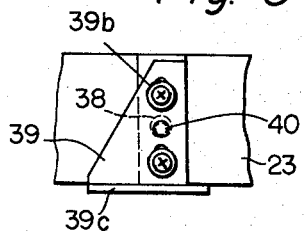
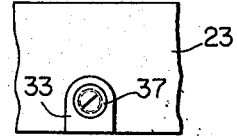

March 19, 1968  HISAKAZU IKEUCHI  3,373,542
COIN HANDLING APPARATUS

Filed May 18, 1965  10 Sheets-Sheet 4

H. IKEUCHI
INVENTOR

BY Wenderoth,
Lind and Ponack ATTORNEYS

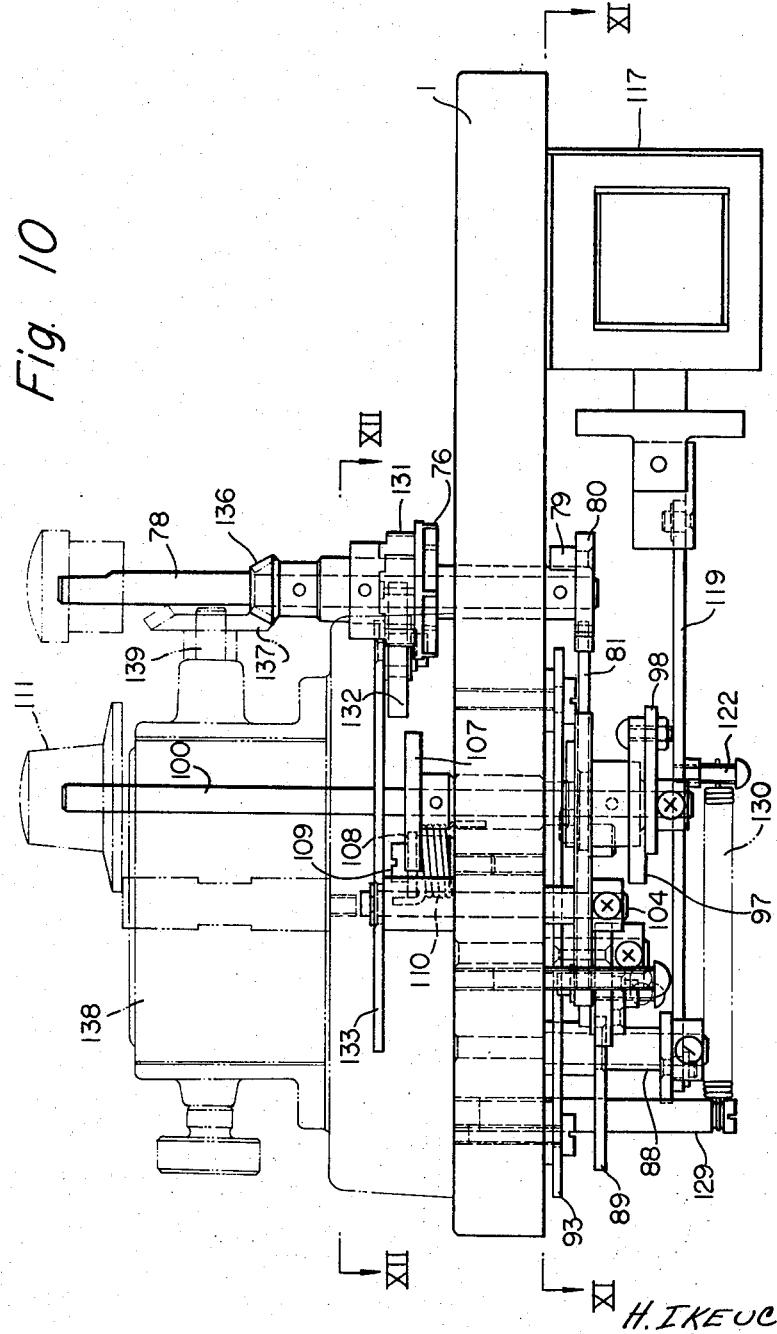

March 19, 1968  HISAKAZU IKEUCHI  3,373,542
COIN HANDLING APPARATUS

Filed May 18, 1965  10 Sheets-Sheet 8

H. IKEUCHI
INVENTOR

BY Wenderoth,
Lind and Ponack ATTORNEYS

H. IKEUCHI
INVENTOR

March 19, 1968  HISAKAZU IKEUCHI  3,373,542
COIN HANDLING APPARATUS
Filed May 18, 1965  10 Sheets-Sheet 10
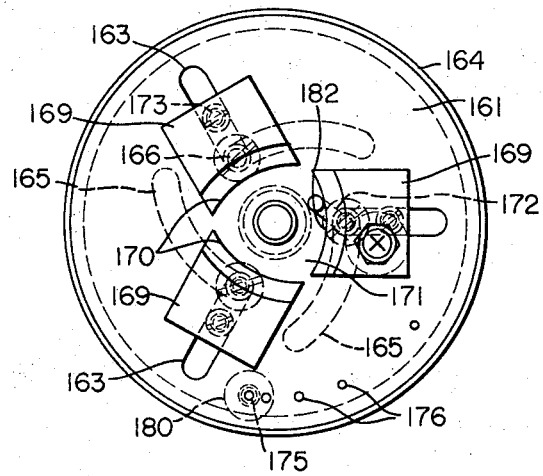
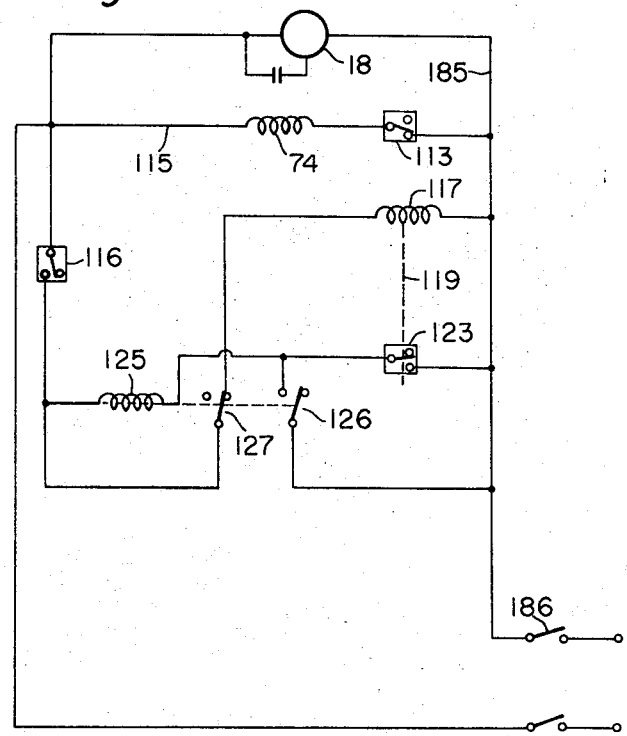
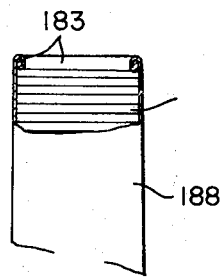
H. IKEUCHI
INVENTOR
BY Wenderoth, Lind and Ponack
ATTORNEYS

United States Patent Office 3,373,542
Patented Mar. 19, 1968

3,373,542
COIN HANDLING APPARATUS
Hisakazu Ikeuchi, Himeji-shi, Japan, assignor to Kokuei Machinery Mfg. Co., Ltd., Himeji-shi, Japan
Filed May 18, 1965, Ser. No. 456,663
Claims priority, application Japan, May 22, 1964, 39/39,492, 39/39,493, 39/39,494, 39/39,496; May 26, 1964, 39/41,060
6 Claims. (Cl. 53—159)

ABSTRACT OF THE DISCLOSURE

A coin handling device for stacking a predetermined number of coins in a wrapper and then securing them in the wrapper, and which consists of a coin transfer device, a coin counting device which counts the number of coins transferred from the transfer device, a coin receiving device which holds a wrapper and receives the coins from the counting device, and a coin wrapper crimping device provided with a crimping hook for crimping the rim of the wrapper; i.e. a paper tube.

Figure 1:
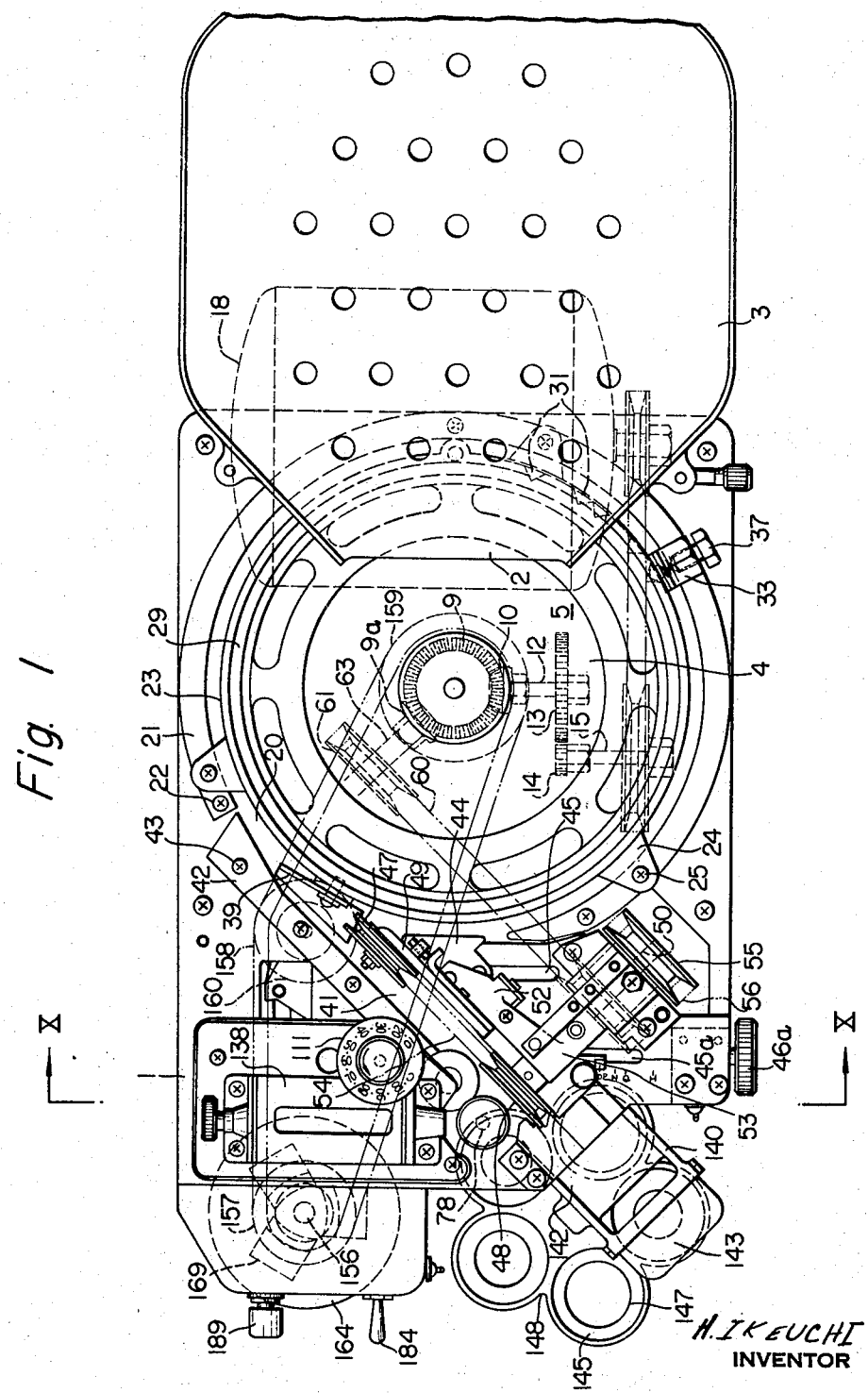

This invention relates to a coin handling apparatus in which a predetermined number of coins are stacked in a coin wrapper and then by crimping the rim at the upper open end of the wrapper the packaging of the coins is accomplished by the top edge of the stacked coins being held by the folded-in or crimped rim of the wrapper.

Although various coin counting machines of this kind have been offered in the past, there were instances where disturbances would occur when the coins were being discharged from the disc and transferred to the counting device because of the coins changing their direction abruptly and being discharged radially of the disc, the disturbance being due to the resistance attending the change in direction of the course of the coins as they leave the disc. Again, in many of the coin packaging machines, it was necessary to exchange the coin tubes and crimpers when the diameter of the coins being handled changed. As a result, it was necessary to provide for exchange parts and tools for accomplishing the change to accommodate the various denominations. Particularly, since an independent crimper separate from the counting machine has been used in connection with the wrapping operation, the weight of the machine as well as the space required has been great, the price also being higher. Further, an automatic stop, was either provided on only a limited number of the machines or the range of possible settings was narrow. None could be found in which the settings could be readily accomplished over a broad range with a constantly small difference in the number of coins counted.

The present invention was made to overcome the foregoing shortcomings. According to this invention, the coins are smoothly transferred from the disc to the counting device and are delivered a predetermined number into a coin wrapper inserted in one of the holes of the coin receiver which is the same as the diameter of the coin and stacked therein.

Then by pressing the coin-filled wrapped from below against a crimper adjusted to the coin diameter, perfectly wrapped coins are obtained. By juxtaposing the coin receiver and crimper alongside the front of the frame of the coin handling machine, the over-all size of the machine becomes small. Moreover, since there is no need for accessories, a very compact unit is obtained.

It is therefore a primary object of this invention to provide a coin handling apparatus which can easily wrap coins of varied denominations having differing diameters and thicknesses.

Another object of the invention is to provide a coin handling apparatus wherein the diameter of the opening in which the coin wrapper filled with the stock of coins is inserted to have its upper, open-end rim crimped is adapted to be adjusted concentrically in accordance with the diameter of the coin by a turning operation of a rotating disc and thus to hold the wrapper containing the stacked coins from its side in an opening conforming in diameter to that of the coin, thereby making it possible to wrap the coins tightly by means of the downward pressure of a crimping hook.

A further object of the present invention is the provision of a coin receiver of special construction, it being one in which the hole positions can be readily changed in accordance with the diameter of the coin to be handled by rotating the receiver and setting it at the specified position. In accordance with this setup, the coin handling operation can be carried out rapidly and easily without the necessity for the provision of coin tubes as exchange parts and special tools, as was the case with the conventional machines.

An additional object of the invention is to provide a coin handling apparatus wherein, in the coin transfer device which transfers the coins by means of centrifugal force as the disc rotates, the gap formed about the entire peripheral rim of the disc is adapted to be adjusted around the entire peripheral rim in accordance with thickness of the coin, thus making it possible for coins to be arranged with certainty piece by piece around the peripheral rim of the disc. In the conventional apparatus of this kind, the adjustment of the coin passage gap was made at only a part of the transfer device in the neighborhood of the coin transfer outlet, with the consequence that the arrangement and hence the flow of the coins was, at times, not smooth. The present invention, however, has eliminated this defect.

Still another object of the invention is to provide a coin handling apparatus wherein, in the transfer device which transfers the coins by means of the centrifugal force as the disc rotates, the direction in which the coins are transferred is established by forming a coin passage tangential to the direction of rotation of the disc, thus rendering the transfer of the coins smooth. Since, in the conventional apparatus of this kind, the coins were transferred in a direction nearly perpendicular to the direction of rotation of the disc, the course of the coins being changed to proceed outwardly, a projecting piece was provided facing inwardly onto the disc to guide the coins into the coin passage. However, in handling the various coins whose differences in diameter were great, there occurred a great loss in the speed of flow of the coins at that part where the coins were led into the passage in the case of some types of coins. In extreme cases, there were even instances in which a coin would become caught between the projecting piece and a next following coin at the point where the course diverges to become jammed there. The present invention has eliminated this difficulty.

Figure 2:
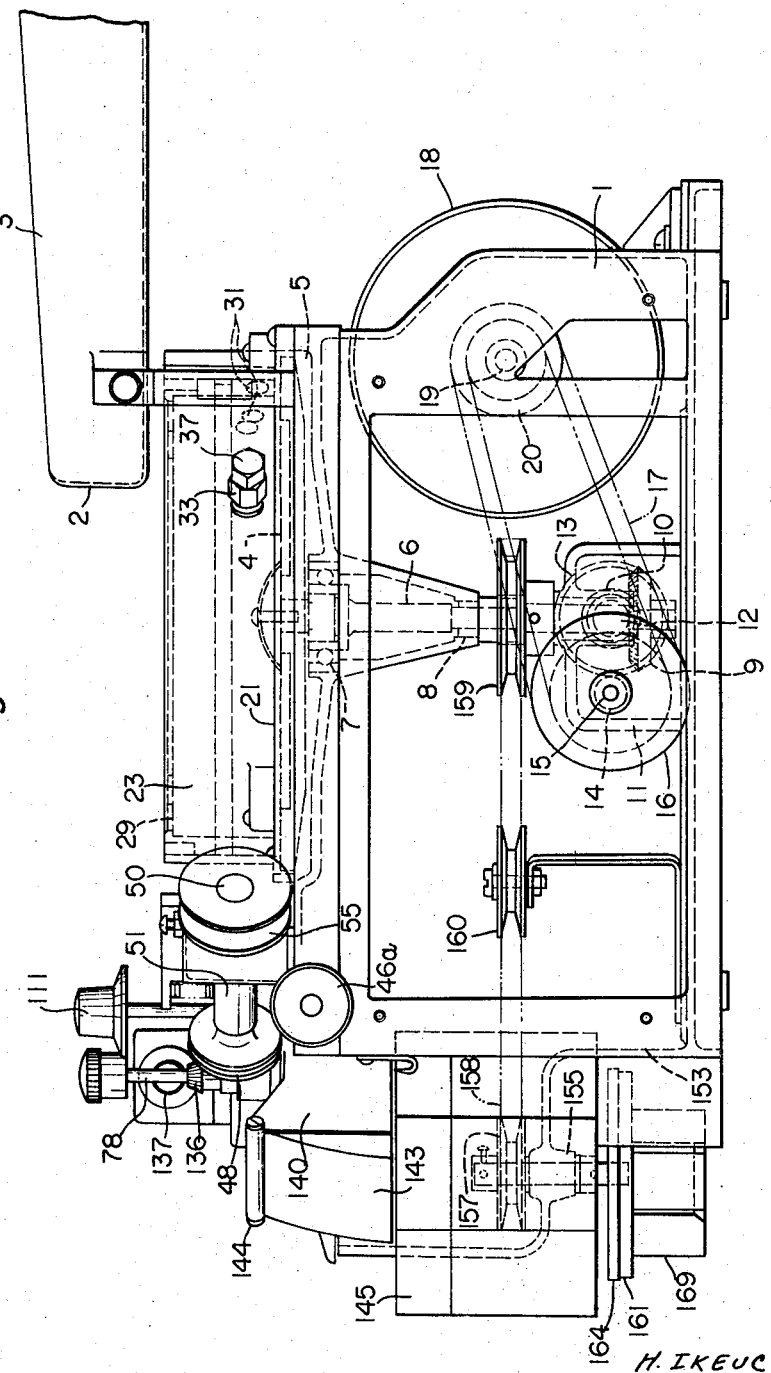
Figure 7:
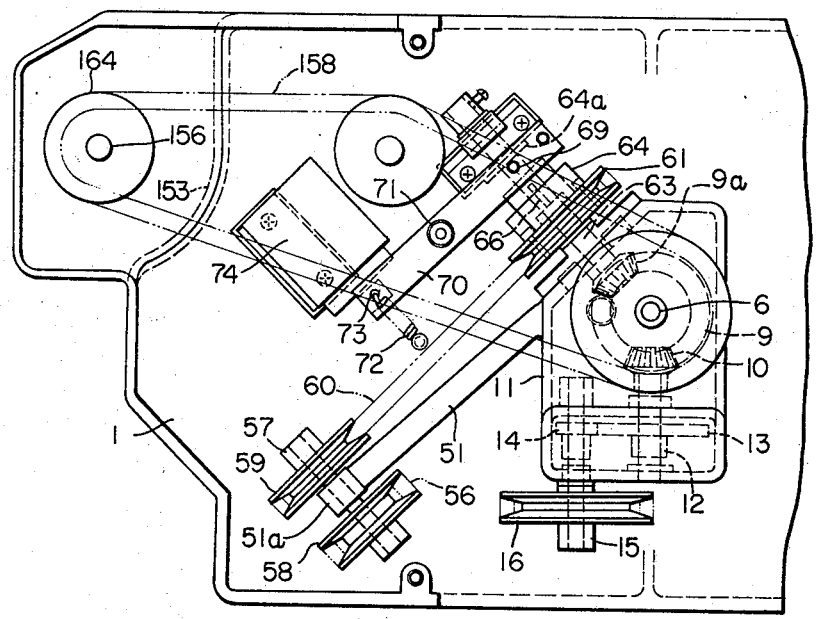
Figure 9:
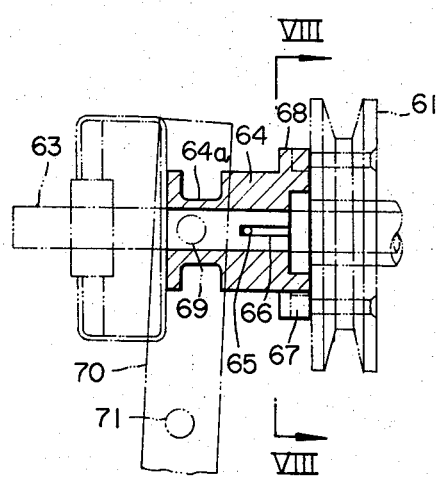
Figure 12:
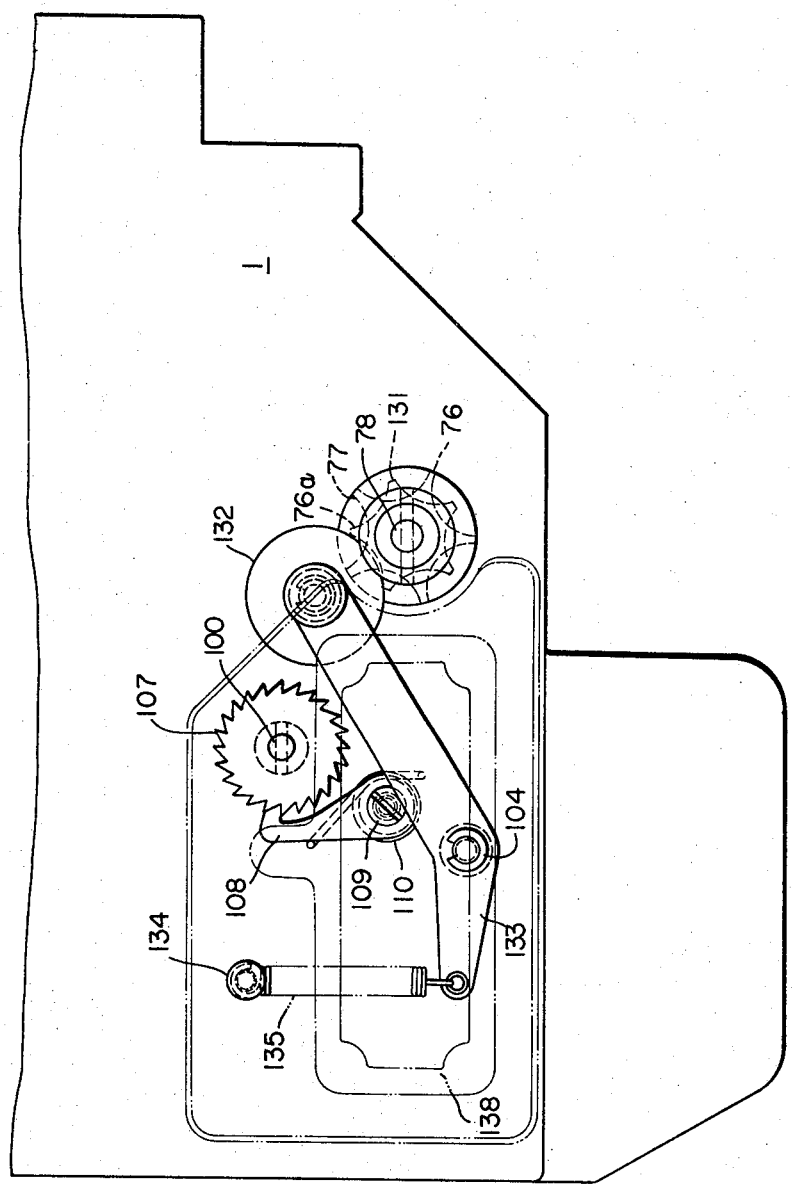
Figure 13:
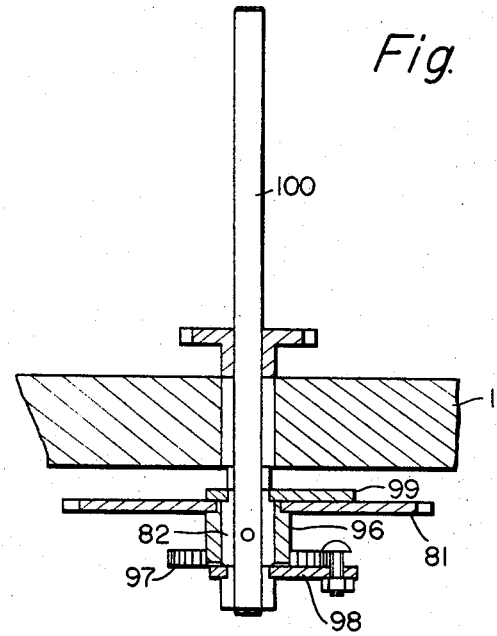
Figure 14:
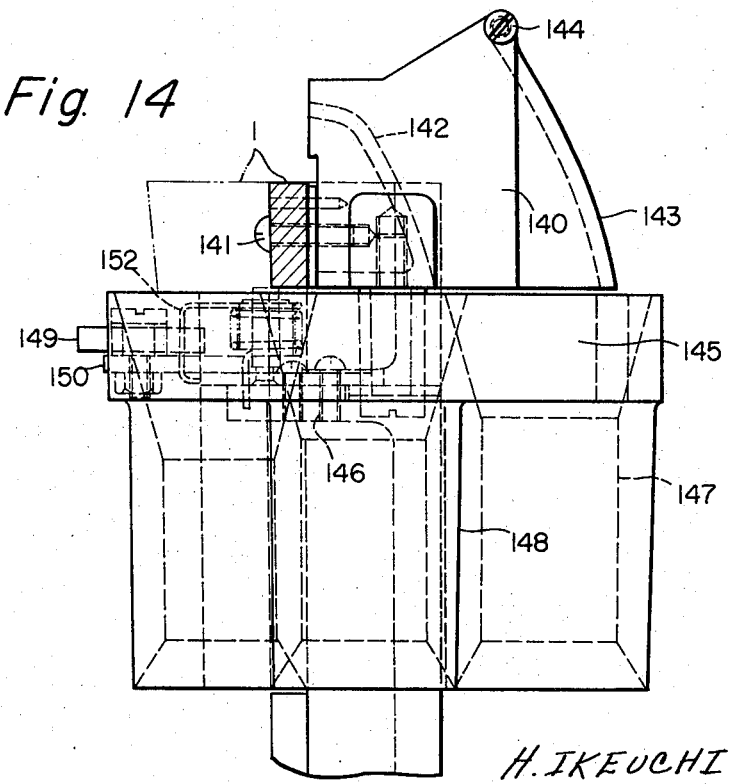

One embodiment of the present invention, a coin handling apparatus made up of a coin transfer device, a coin counting device, a coin receiving device and a coin wrapping device, will be described with reference to the accompanying drawings, wherein:

FIG. 1 is a plan view of the coin handling apparatus, FIG. 2 being a side view thereof. FIG. 3 is a plan view of the disc portion of the coin transfer device part, FIG. 4 being a side view thereof in vertical section taken along line IV—IV of FIG. 3, FIG. 5 being a side view as seen from line V—V of FIG. 4, and FIG. 6, a side view as seen from line VI—VI of FIG. 3. FIG. 7 is a plan view of the clutch device by which is accomplished the starting or stopping of the conveyor belt of the coin passage (the device being shown with the upper plate of the machine frame removed), FIG. 8 being a side view of the clutch member thereof, being a sectional view taken along line VIII—VIII of FIG. 9, while FIG. 9 is a front view in vertical section taken along line IX—IX of FIG. 8. FIG. 10 is a front view of the counting device part, FIG. 11 being a plan view thereof taken along line XI—XI of FIG. 10, FIG. 12 a plan view taken along line XII—XII of FIG. 10, and FIG. 13, a sectional view taken along line XIII—XIII of FIG. 11. FIG. 14 is a side view of the coin receiving device, FIG. 15 being a plan view thereof. FIG. 16 is a side view in vertical section of the coin wrapping device, FIG. 17 being a bottom view thereof. FIG. 18 is an electric circuit diagram of the wiring setup by which the present apparatus is operated, and FIG. 19 is a front view partly broken away illustrating the wrapped coins.

1. Coin transfer device

The coin transfer device, as shown in FIGS. 1 and 2, is provided above and to the rear of the upper plate of the frame 1 with a tray 3 which is formed with a mouth 2 at its front end. A disc 4, which rotates horizontally below the mouth 2 of tray 3, is disposed in a concave part 5 formed in the upper surface of the aforesaid frame 1. The disc 4 is mounted by way of a ball bearing 7 and a bushing 8 to a shaft 6, which rotates vertically in the frame. A bevel gear 9 fitted on the shaft 6 meshes with a bevel gear 10 fitted on a shaft 12 journaled horizontally in a gear box 11 provided in the base of the frame 1. A gear 13 provided on the shaft 12 meshes with a gear 14 fitted on another shaft 15 journaled in the gear box 11. A drive belt 17 is mounted around a pulley 16 on a shaft 15 and a pulley 20 mounted on a drive shaft 19 of an electric motor 18. The shaft 15 is rotated by the operation of the motor 18 through the medium of the belt drive. Upon rotation of the shaft 15, the shaft 12 is rotated via the meshing of gears 13 and 14. And with the rotation of the shaft 12, the shaft 6 is rotated through the medium of bevel gears 9 and 10, with the consequence that disc 4 is rotated.

Secured to the upper plate of the frame 1 is an annular guide ring 21 formed with a coin transfer cut-away portion 20 in its left front side (see FIG. 3). On top of the guide ring 21, as shown in FIGS. 3 and 4, are secured by means of screws 25 to the upper plate of the frame, supporting pieces 24 protruding from the bottom of the outer periphery of an annular fixed outer rim 23. A gap 26 is formed in this manner between the underside of the fixed outer rim 23 and the aforementioned disc 4, the magnitude of which gap is slightly greater than the thickness of the thickest coin to be handled. A thread 27 having a generally square profile is formed at the upper side of the inner periphery of the fixed outer rim 23, and a square profile thread 28 which engages said square profile thread 27 is formed at the upper side of the outer periphery of an annular thickness adjuster or inner rim 29, which fits rotatably inside this fixed outer rim 23. A horizontal and annular groove 30 is formed in about the middle of the vertical dimension of the outer periphery of the adjuster 29. In the outer periphery of the adjuster 29 below the groove 30 are provided in several places so as to be at successively different heights stop-pin recesses 31. A ball-shaped stop-pin, as shown in FIG. 3, which engages the several stop-pin recesses 31 is provided in hole 34 of a protruding portion 33 protruding from rim 23 so as to be capable of advancing and retracting. A spring 35 which urges the stop-pin 32 inwardly is secured at its outer end to a screw 37 screwed into a threaded hole 36 formed in the protruding portion 33. When the aforesaid thickness adjuster 29 is manually rotated, it is moved either upwardly or downwardly by means of the square profile threads 28 and 27 provided respectively in the outer periphery of the thickness adjuster 29 and the inner periphery of the outer rim 23. Thus, the gap 26a between the underside of the thickness adjuster 29 and the upside of the disc 4 can be adjusted to conform with the thickness of the coins to be selected. By providing indicia (not shown) about the rim of the adjuster 29 at its top in accordance with the denominations of the coins, such as, for example, pennies, nickels, dimes, quarters, half dollars and dollars, and adjusting the adjuster by turning it to the position indicated by the indicia, the gap 26a is adjusted in accordance with the thickness of the coins to be selected. Further, the several stop-pin recesses formed in the outer periphery of the thickness adjuster 29 are shifted and the stop-pin 32 which had been stopped in one of the stop-pin recesses 31 is pushed outwardly by means of the outer periphery of the thickness adjuster 29 against the action of the spring 35. Then, upon the adjuster 29 being set in its prescribed position, the stop-pin 32 stops in a stop-pin recess 31 located at this position to lock the adjuster 29 thereat.

Next, as shown in FIGS. 4 and 5, a hole 38 is provided in the outer rim 23 vertically thereof in a position of the cut-away portion 20 of the fixed guide ring 21. A guide pin 40, which projects inwardly from an angle-shaped gap adjuster 39 in abutting contact with the outside of the outer rim 23, extends through this hole 38 and is made to fit in the guide groove 30 in the foregoing thickness adjuster 29. Thus, as the thickness adjuster makes up-and-down movements, the guide pin 40 in engagement with the guide groove 30 is raised or lowered, with the consequence that the gap adjuster 39 is moved either upwardly or downwardly to adjust the gap between the underside of the foot or flange 39c of the adjuster and the delivery side of the coin passage 41 (FIG. 1) in concomitance with the up-and-down movements of the thickness adjuster. A guide screw 39b passed through a slot 39a at the other end of the adjuster 39 is screwed into the outer rim 23.

Next, on the top and front of the frame 1 and externally of the coin transfer cut-away portion 20, a coin guide plate 42 is secured to the frame by means of screws 43 tangentially with respect to the direction of the rotation of the disc 4. Facing this coin guide plate is disposed a diameter adjuster 44, one end of which is placed opposite the other side of the cut-away portion 20. The diameter adjuster 44 is adapted to be movable in parallel to the guide plate 42. The coin passage 41 is formed between the guide plate 42 and the diameter adjuster 44, tangentially of the disc 4. From the diameter adjuster 44 stubs (not shown) project downwardly and fit into respective slot 45 and 45a, which are provided in the upper plate of the frame 1, and extend parallel to each other. By turning a knob 46a, the diameter adjuster 44 is caused to advance or retract along slots 45 and 45a, being operatively connected thereto in conventional manner, such as by screw threads. Thus, the distance between the guide plate 42 and the diameter adjuster 44, i.e., the width of the coin passage 41, is adjusted to conform to the diameter of the coin being handled. As the aforesaid disc 4 rotates, the coins which have been fed onto the disc 4 are moved to the periphery of the disc by means of centrifugal force, where they are moved along the inner periphery of the guide ring 21 in the direction of the rotation of the disc 4. When the coins which are being moved about arrive at the coin transfer cut-away portion 20, they are delivered through the cut-away portion 20 along the coin guide plate 42 into the coin passage 41.

Figure 8:
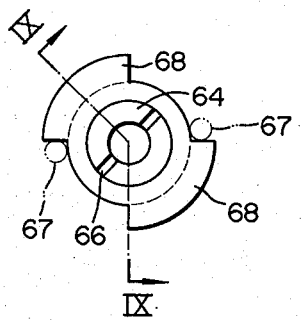

Pulleys 47 and 48 are provided above the coin passage 41, pulley 48 being supported on a shaft 50 which is journalled in a bearing 53 provided on the upper plate of the frame 1, while pulley 47 is rotatably mounted on an arm 49 attached to a projecting member 52 extending from the bearing 53. A conveyor belt 54 is mounted around the two pulleys 47 and 48. Now, by making the bearing 53 adjustable vertically of the frame by conventional means (not shown), the adjustment of the clearance between the coin passage 41 and the underside of the belt can be effected by adjusting the two pulleys upwardly or downwardly, with the consequence that the coins can be moved along smoothly. A pulley 55 provided at the other end of the shaft 50 has therearound a drive belt 56 which, as shown in FIG. 7, is mounted below the pulley 55 inside the frame 1 around a pulley 58 mounted on a shaft 57. The shaft 57 is supported by means of a bearing 51a disposed at the distal portion of an arm 51 projecting from the aforementioned gear box 11 and has another pulley 59 mounted thereon. A belt 60 is mounted around pulleys 59 and 61. The pulley 61 is so mounted as to be rotatable about a shaft 63, which latter is rotatably mounted in the gear box 11 and has a clutch member 64 mounted thereon slidable axially of the shaft 63. As shown in FIGS. 8 and 9, the clutch member 64 has a key groove 66 which extends axially thereof and has therein a pin 65 projecting radially from the shaft 63. As a consequence, the clutch member 64 is rotated in operative connection with the shaft 63, by the latter's rotation as a result of the engagement of the pin 65 with the key groove 66, while it slides axially to-and-fro. On one side of the clutch member 64 are provided projecting clutch teeth 68 which engage clutch pins 67 disposed on one side of the pulley 61. About the periphery of the clutch member 64 concentric with the shaft 63 is formed as annular groove 64a. An upright shaft 71 is provided in the base of the frame 1 and pivotally mounted on this shaft is an actuating lever 70 whose one end is in engagement with the groove 64a by way of a pin 69. At the other end of this actuating lever 70 is connected a coil spring 72 which normally pulls in a direction so as to disengage the clutch member 64 from the pulley 61 the spring being secured in a hole 73 provided at the end of the lever. Further, on the opposite side of lever 73 is a solenoid 74, which provides attractive force to counter the action of the spring 72, the end piece (not shown) of the attraction-actuated rod 75 of the solenoid being secured in the hole 73. The bevel gear 9a of the shaft 63 on which is axially mounted the foregoing clutch member 64 meshes with the bevel gear 9 provided on the previously mentioned shaft 6. As the shaft 6 rotates, shaft 63 is rotated via bevel gears 9 and 9a, and in consequence, the clutch member 64 is rotated with the pin 65 and the key groove 66 in engagement. Now, when solenoid 74 is energized, the actuating lever 70 is turned about the center of the shaft 71 against the action of the spring 72, with the consequence that the pin 69 of the actuating lever 70 in engagement with the annular groove 64a of the clutch member 64 presses the clutch member 64 to engage the clutch teeth 68 with the clutch pins 67, thereby effecting the coupled rotation of the pulley 61 with the shaft 63. The rotation of the pulley 61 rotates the shaft 57 through the medium of the belt 60, the rotation then being transmitted from the pulley 58 to the pulley 55 through the medium of the belt 56. Thus, the coins which have been delivered into the coin passage 41 by means of the centrifugal force of the disc 4 are conveyed to the forward end of the coin passage 41 by means of the belt 54. When the solenoid 74 becomes de-energized, the attraction of the attraction-actuated rod 75 is released and the actuating lever 70 is turned about the center of the shaft 71 by means of the action of the spring 72. As a result, the pin 69 of the actuating lever 70 in engagement with the annular groove 64a of the clutch member 64 pushes the clutch member 64 in the opposite direction and disengages the clutch teeth 68 of the clutch member 64 from the clutch pins 67 of the pulley 61. The rotation of the pulley 61 is thus stopped, with the consequence that the aforesaid transmission of the rotation ceases and the transfer of the coins along the coin passage 41 is also stopped. A counting star wheel 76 protrudes into the coin passage 41.

2. Coin counting device

Figure 11:
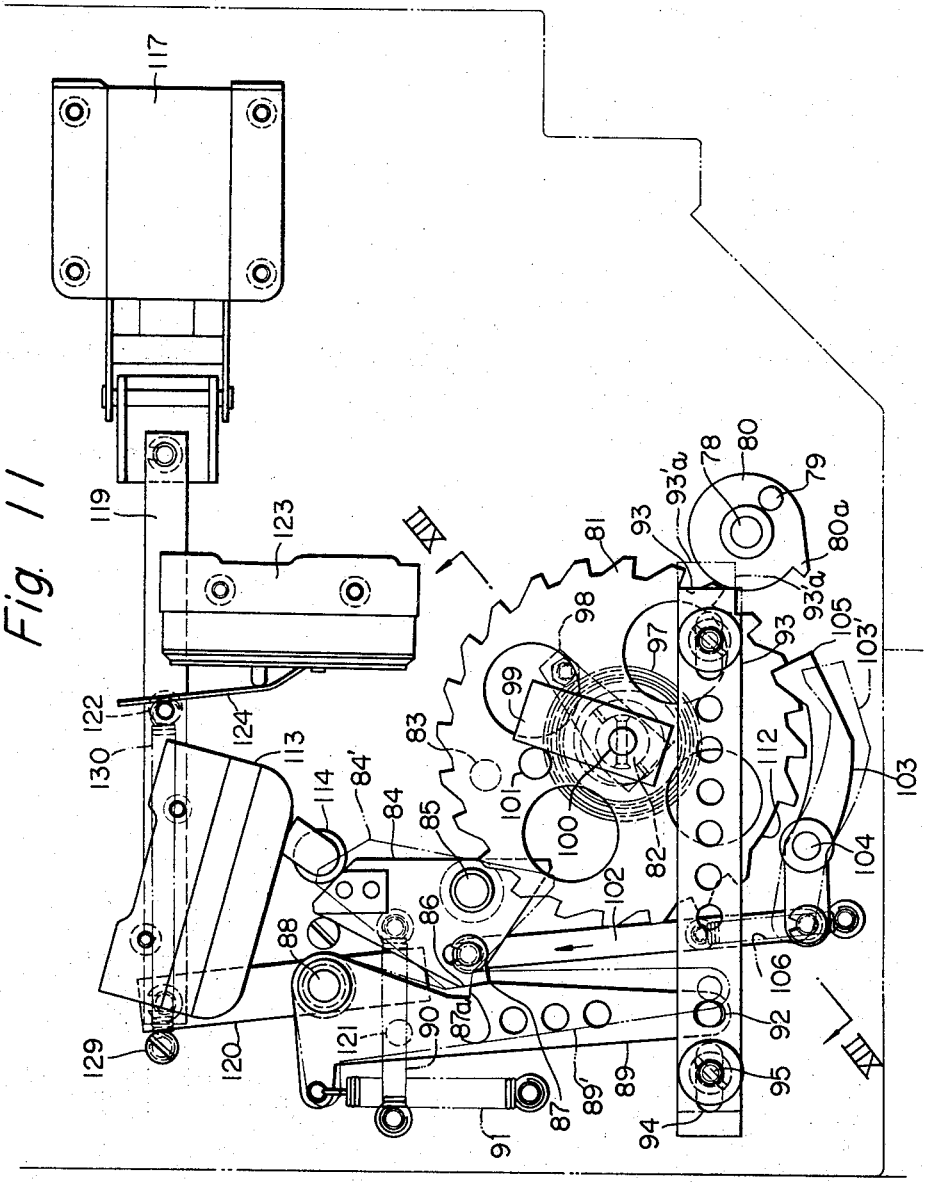

The following is a description of the counting device. The star wheel 76 has five concave portions 77 around its periphery, with which portions the coins come into engagement. One concave portion is rotated segmentally by means of one coin that is conveyed past it by means of the aforementioned conveyor belt 60, and thus the star wheel 76 makes one complete rotation upon the passage of five coins. Next, as shown in FIGS. 10 and 11, a shaft 78 carrying the star wheel 76 is mounted vertically in the frame 1, passing through the upper plate of the frame, and at its end is provided an actuating disc 80 having a finger 80a projecting therefrom. A ratchet wheel 81 which is in engagement with the finger 80a of the actuating disc 80 is fitted rotatably on a boss 82 rotatably mounted in the frame 1. As the star wheel 76 makes one rotation, the actuating disc 80 is rotated once and the ratchet wheel 81 in engagement with the finger 80a of the actuating disc 80 is caused to turn an angular distance equal to one tooth segment. The ratchet wheel 81 has a pin mounted thereon extending downwardly therefrom. A lock cam 84 with which the pin 83 comes into engagement is mounted rotatably on a shaft 85 provided in the frame 1. The lock cam 84 is formed with a projecting edge 86 which engages an engaging edge 87 having an engaging notch 87a of a lock lever 89 mounted rotatably on a shaft 88 extending downwardly from the frame 1. Further, a coil spring 90 is fitted between the lock cam 84 and the frame 1, which normally biases the lock cam towards the lever 89 to effect the engagement of the projecting edge 86 and the edge 87. Another coil spring 91 is fitted between the end of a small arm of the lock lever 89 and the underside of the upper plate of the frame 1. The spring 91 biases said small arm so as to make possible the engagement of the projecting edge 86 with the engaging notch 87a. A shaft 92 provided on the lock lever 89 and projecting upwardly therefrom is pivotally coupled to a movable lock plate 93. The lock plate 93 has slots 94 in its front and rear end, into which slots fit guide rods 95 which depend from the upper plate of the frame 1. The distal portion 93a of this lock plate 93 is adapted, when it advances to the position 93a shown in broken lines, to engage a pin 79 extending upwardly from the actuating disc 80. When the ratchet wheel 81 turns the prescribed amount as a result of the rotation of the shaft 78 carrying the star wheel 76, the pin 83 of the ratchet wheel 81 presses against the lock cam 84, and as a consequence, the lock cam 84 turns around the shaft 85 against the action of the coil spring 90 to the position indicated by the broken line 84′. Thus the engagement between the projecting edge 86 of the lock cam 84 and the engaging edge 87 of the lock lever 89 is released, the projecting edge 86 of the lock cam 84 engages the engaging notch 87a of the lock lever 89, and the lock lever 89 is turned around the shaft 88 by means of the spring 91 to the lock cam 84 side, i.e., counterclockwise. As a result of the rotation of the lock lever 89 to position 89′, the lock plate 93 advances to position 93′, the distal portion of the lock plate 93 becomes engaged with the pin 79 projecting from the actuating disc 80 carried by the shaft 78, with the consequence that the rotation of the actuating disc 80 and the star wheel 76 carried by the shaft 78 are stopped. Hence, the passage of coins in a number greater than that predetermined is stopped by means of the starwheel 76. Next, one end of a spiral spring 97 is secured to a hub 96 of the ratchet wheel 81, while its other end is secured to a fixed piece 98 secured to a shaft 100 passing through the boss 82 and the frame 1. A start adjuster 99 is secured fast to the shaft 100 between the frame and the ratchet wheel 81, and the start adjuster 99 is adapted to be in engagement with a check projection 101 projecting from the ratchet wheel 81. One end of a pawl link 102 is pivotally attached to the aforesaid lock cam 84, and to the other end of said link 102 is pivoted the rear end of a pawl 103. The pawl 103 is pivoted to the frame 1 by means of a supporting shaft 104, and the distal end of the pawl 103 is formed into an engaging part 105 which engages the aforesaid ratchet wheel 81. When the lock cam 84 turns by being pressed by the engaging projection 83 of the ratchet wheel 81, the pawl link 102 is pulled in the direction of arrow shown on link 102, the pawl 103 turns to the position 103′ by the action of a coil spring 106 connected between the pawl link 102 and the frame 1, and the engaging part 105 of the pawl 103 is turned in a direction opposite to that of the ratchet wheel 81, i.e., in a clockwise direction. When the pawl 103 is disengaged from the ratchet wheel 81, the latter is given a reverse rotation by means of the restorative force of the spiral spring 97 which had been wound up during the counting process. Then when the check projection 101 of the ratchet wheel 81 becomes engaged with the start adjuster 99, the reverting rotation of the ratchet wheel 81 ceases, it having reverted to its starting position. On the top of the frame 1, a ratchet wheel 107 is disposed and a pawl 108 which engages said ratchet wheel is pivotally mounted on a pin 109 mounted in the frame 1. A torsion spring 110 fitted about the pin 109 has its one end secured to the pawl 108 and its other end to the frame 1. The torsion spring 110 normally urges the pawl 108 against the ratchet wheel 107 to hold them in engagement. When the position of the start adjuster 99 is adjusted by turning the shaft 100 in a direction opposite to that in which the pawl 108 and wheel 107 are engaged by means of an adjusting knob 111 disposed at the top end of the shaft 100, the shaft 100 can be set at the adjusted position by the engagement of the pawl 108 and the ratchet wheel 107. The prescribed number of coins can then be counted as indicated by the setting of the shaft 100. The previously mentioned ratchet wheel 81 has at one part 112 thereof a tooth cut away. If the start adjuster 99 is moved so that the cut-away portion 112 and the finger 80a are opposite each other, the finger 80a not being in engagement with the ratchet wheel 81, the ratchet wheel 80 is not rotated by the finger 80a. Thus, the transfer of the coins can be continued without interruption.

Next, as shown in FIGS. 11 and 18, an actuating roller 114 of a microswitch 113 is caused to be in engagement with the aforementioned lock cam 84, the microswitch 113 being opened when the lock cam 84 rotates after the prescribed number of coins have been counted. This microswitch is included in the electric circuit of the solenoid 74 which operates the aforementioned clutch member 64. Hence, the solenoid 74 becomes de-energized upon opening of the microswitch 113, and as a result, the clutch member 64 becomes disengaged and the operation of the conveyor belt 54 disposed above the coin passage 41 ceases, thus stopping the transfer of the coins. When the lock cam 84 reverts to its former position, the microswitch 113 is closed. As a consequence, with the electric circuit 115 of the solenoid 74 being closed, the solenoid 74 is energized and actuated to throw the clutch member 64 into engagement and again start the transfer of the coins. On the other hand, when a starting switch 116 is closed, a solenoid 117 is energized and actuated to pull a link 119. As a result, a lever 120 pivotally attached to the end of said link 119 is rotated about the shaft 88 of the aforementioned lock lever 89. Thus the lever 120 becomes engaged with a projecting pin 121 provided in the lock lever 89 to release the engagement between the engaging notch 87a of the lock lever 89 and projecting edge 86 of the lock cam 84. Thus, the lock cam 84 is free to carry out the reverting rotation by means of the spring 90, the projecting edge 86 of the lock cam 84 becomes engaged with the engaging edge of the lock lever 89, the pawl link 102 is pulled, the pawl 103 becomes engaged with the ratchet wheel 81 and at the same time the lock lever 89 reverts to its original position by means of the coil spring 91. The lock plate retracts from its position at 93′ to 93 and its engagement with the pin 79 of the actuating disc 80 is released, and the star wheel 76 is turned by the coins which pass by it. An operating lever 124 of a microswitch 123 in engagement with a pin 122 on the link 119 is pressed by the attractive action of the solenoid 117 and is closed. At this time, a relay 125 interposed between the microswitch 123 and the starting switch 116 is energized and actuated by the closing of the aforesaid starting switch 116 and a relay 126 for the holding circuit for relay 125 is closed, while at the same time a relay 127 is opened and the solenoid 117 is de-energized. By the de-energizing action of this solenoid 117, the link 119 is caused to revert to its original position by means of a coil spring 130 fitted between the pin 122 of said link 19 and a stud 129 of the frame 1, and the engagement between the lever 120 and the projecting pin 121 of the lock lever 89 is released. Even though the starting switch 116 is kept pressed at this time, since the coil 125 continues its attraction of the contact, the de-energization of the solenoid 117 continues. Further the link 119 does not again draw the lock lever 89 and the engagement of the engaging notch 87a of the lock lever 89 with the projecting edge 86 of the lock cam 84 does not become disengaged, remaining intact even though one cycle of the counting action is completed. Therefore, no error in counting occurs even though the switch is continuously pressed for awhile when counting a very small predetermined number of coins.

Further, a check wheel 132, which engages with a star wheel 131 provided on the shaft 78 above the star wheel 76, is pivotally mounted on a lever 133, which lever 133 is, in turn, rotatably mounted on the aforementioned supporting shaft 104. A spring 135 is installed between this lever 133 and a pin 134 projecting from the frame 1 so as to effect normally the engagement of the check wheel 132 with a star wheel 76a. A bevel gear 136 provided on the shaft 78 carrying the star wheel 76 meshes with a bevel gear 137 provided on the actuating shaft 139 of an integrating count register 138. The number of coins passing through the coin passage 41 is thus confirmable by means of this count register 138.

3. Coin receiving device

Figure 15:
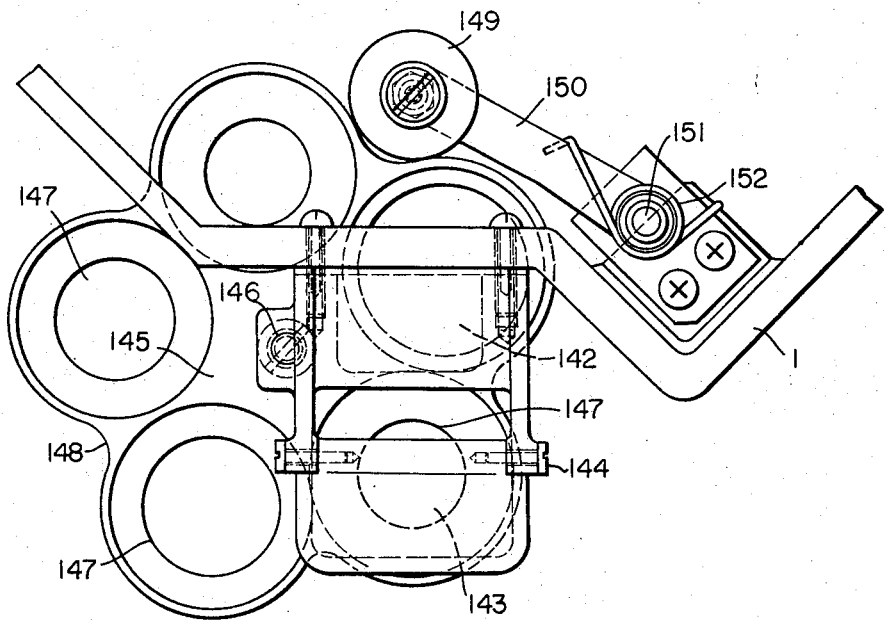
Figure 16:
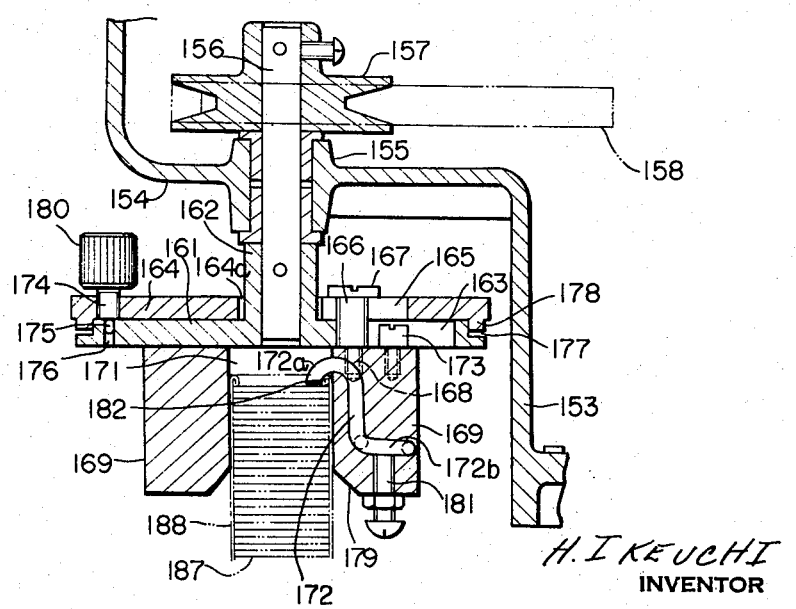

The coin receiving device, as shown in FIGS. 1, 14 and 15 is made up in the following manner. Below the end of the coin passage 41 from which the coins are delivered and in front of the frame 1 is disposed an outlet 140 secured with a screw 141 to the frame. The outlet 140 has an inclined guiding surface 142 in its rear part, while at its front part it has a deflector 143 which covers not only the extended portions on both sides of the outlet 140 but also the mouth portion at the front of the outlet, the deflector being mounted on the outlet 140 so as to be pivotable. A coin receiver 145 at its central part is pivoted on pivot 146 contiguously to the underside of the outlet 140. The coin receiver 145 has several cylindrical coin receiving holes 147 of different diameters depending therefrom with the centers of the several holes being positioned on substantially the same circumference. Those portions of the periphery of the coin receiver 145 lying between the several adjacent coin receiving holes 147 are formed into arcuate concavities 148. A check wheel 149 which engages said arcuate concavities 148 is rotatably mounted on an arm 150, the arm, in turn, being pivotally mounted on a pin 151 provided on the side of the frame 1. A torsion spring 152 is provided about the pin 151, one end of which spring is secured to the arm 150 while the other end is secured to the frame 1. The coins which have been transferred from the coin passage 41 slide along the inclined guiding surface 142 of the outlet 140 and drop into the coin receiving hole 147 of the coin receiver 145 provided below the outlet 140 without escaping to the outside owing to the deflector 143. A coin wrapper 188 of tubular shape and having a bottom is placed in advance in the coin receiving hole 147, the top end of the wrapper being left open. Thus, the coins which drop into hole 147 are stacked successively in the coin wrapper 188 so as to be one on top of the other as shown at 187. The coin receiving holes 147 of the proper diameter to receive the coins to be wrapped are correlated by rotating the coin receiver 145 and bringing below the inclined guiding surface 142 the coin receives hole 147 having a diameter corresponding to that of the coins to be wrapped. The check wheel 149 mounted on the arm 150 and urged by means of the torsion spring 152 into engagement with one of the arcuate concavities 148 formed about the outer periphery of the coin receiver 145 prevents the rotation of the coin receiver 145, but is disengaged by rotating the coin receiver 145 against the action of the spring 152 for engagement with one of the other concavities.

4. Coin wrapping device

The wrapping device, as shown in FIGS. 1, 2, 16 and 17, is made up as hereinafter described. At the front and lower left of the frame 1 an upright wall 153 is formed and in a bearing 155 disposed in a horizontal part 154 of said wall 153 is journaled a vertical rotating shaft 156. A pulley 157 is fitted on the shaft 156 and a drive belt 158 is mounted around the pulley 157 and a pulley 159 fitted on the previously mentioned shaft 6. At an intermediate point of the drive belt 158 it is brought into engagement with a tension pulley 160 mounted on an elbow or a bent arm on the frame and projecting from the bottom thereof. A disc 161 is mounted by way of a hub 162 on the shaft 156 and in this disc are provided three guiding slots 163 disposed radially about the disc at 120-degree intervals. Superposed on the disc 161 and fitted in a center hole 164a and freely rotatable about the hub 162 of the disc is a discoidal adjusting plate 164. Three arcuate slots 165 which converge towards the center of the adjusting plate 164 are provided in the adjusting plate 164 so as to be equiangular and equidistant radially of the center of the adjusting plate. Engaging bolts 166 are passed through the arcuate slots of the adjusting plate 164 and the guiding slots 163 of the disc 161. The heads 167 of the engaging bolts 166 are retained by the peripheral edge of each arcuate slot 165 of the adjusting plate 164, while the bottom threaded portions 168 of the engaging bolts 166 are screwed into the top sides of supporting members 169 which are disposed annularly about the underside of the disc 161. The inner side surface 170 of each of the supporting members 169 is formed into an arcuate concave surface, and a tubular opening 171 is formed between the three supporting members disposed as hereinabove described. In one of these supporting members is positioned a gooseneck-shaped crimping hook 172 whose distal portion is bent, the hook projecting from the inner side surface 170 of the supporting member 169 in such a fashion that the distal curved portion 172a faces downwardly while an elbow 172b at the other end of the crimping hook 172 is secured to the inside of the supporting member 169 by means of a set screw 181. The tip of the crimping hook 172 is inclined in the direction of the rotation of the disc 161. Guide studs 173 screwed into the top of the supporting members 169 are caused to be in engagement with the guiding slots 163 of the disc 161.

A lock pin 174 is provided in the adjusting plate 164 with its distal locking portion 175 being adapted to engage in accordance with the diameter of the coin to be handled in one of the plurality of lock holes 176 drilled in the disc 161.

Further, the peripheral edge of the disc 161 is formed with an annular guiding shoulder 177 about around which fits a protruded circular collar 178 provided on the underside of the adjusting plate 164. The bottom of the inner side surface 170 of the aforesaid supporting member 169 is formed with a flared guide surface 179. When a knob 180 mounted on said lock pin 174 is pulled upwardly to extract its locking portion 175 from one of the lock holes 176 in which it had been set and the adjusting plate 164 is turned, the supporting members are moved radially of the disc 161 either towards the center thereof or outwardly by means of the guide studs 173, with the engaging bolts 166 which are in engagement with the arcuate slots 165 of adjusting plate 164 acting as guides. Hence, the diameter of the opening 171 formed between the arcuate inner side surfaces 170 of the supporting members 169 can be adjusted concentrically to conform with the diameter of the coin to be handled. By insertion and locking of the locking portion 175 of the lock pin 174 in the lock hole 176 of the disc 4 at the adjusted position, the adjusting plate 164 is locked on the disc 161. When the electric motor 18 is started up in this state, the disc 161 is rotated through the medium of the belt 158, and the supporting members 169 are revolved about the center of the disc 161. When the rim of the upper open end of the coin wrapper 188 holding the predetermined number of coins stacked therein is pressed upwardly into the opening 171 of the revolving supporting members 169 from below, the rim of the coin wrapper 188 is crimped by the inwardly curved part of the end 182 of the crimping hook 172 which protrudes into the opening 171. Thus, the wrapping of the stacked coins is completed by the top edge of the stacked coins being held by the crimped retaining portion 183 of the coin wrapper 188 as shown in FIG. 19. When the diameter of the coins handled is small, the number of the aforesaid supporting members 169 need not be three, two being sufficient to serve the purpose. Further, a crimping hook 172, if desired, may be installed in each of the supporting members.

5. Operation

Next, the operation of the apparatus will be described. First, before starting the wrapping operation, the gap 26a between the upside of the disc 4 and the underside of the thickness adjuster 29 of the coin transfer device part is adjusted to conform to the thickness of the coin to be handled. Then the width between the coin guide plate 42 and the diameter adjuster 44 which constitutes the coin passage of the coin transfer device is adjusted to conform with the diameter of the coin to be handled. Next, the coin counting device is adjusted as to the number of coins to be wrapped per package. Further, the coin receiving device is adjusted to conform with the diameter of the coin to be handled by rotating the coin receiver 145 and bringing the coin receiving hole 147 having the corresponding diameter in alignment below the inclined guide surface 142 and guide surface 143. In addition, the opening 171 formed between the arcuate inner surfaces 170 of the supporting members 169 provided in the disc 161 of the coin wrapping device part is adjusted in accordance with the diameter of the coin to be wrapped.

Next, the coins are dumped in the tray 3 and the main switch 186 is closed with its lever 184. The circuit 185 of the electric motor 18 is thus closed to start the motor running whereby the disc 4 is rotated. The operation of the motor 18 also rotates the disc 161. Then, upon closing the starting switch 116 by means of a push button 189, the solenoid 117 is energized and actuated and the link 119 rotates the lever 120. As a result, the lock lever 89 is rotated from the position shown by the broken line 89' to the full line position by the engagement of the projecting pin 121 with the lever 120. The lock cam 84 is also moved from position 84' to 84, the pawl 103 is rotatingly reverted by means of the link 102 from position 103' to 103 by the restorative elastic force of the spring 106, and the pin 79 engaged at 93' with the lock plate 93 is released to be able to rotate the shafts 78. The microswitch 113 closes as a result of the rotation of the lock cam 84 to energize and actuate the solenoid 74. The clutch member 64 is thus thrown into engagement with the pulley 61 and the conveyor belt 54 of the coin passage 41 is driven. Next, when the coins in the tray 3 are fed onto the disc 4 via the mouth 2 of the tray, the coins are successively moved over to the peripheral rim of the disc 4 by means of the centrifugal force of the disc as it rotates. The coins then enter the gap 26 formed between the disc 4 and the thickness adjuster 29 and are moved in the direction of the rotation of the disc along the inner periphery of the guide ring 21. Since the gap 26a between the disc 4 and the adjuster 29 is adjusted in this case to conform with the thickness of the coins to be counted, the coins are conveyed one by one with certainty and by being moved along the guide ring 21 arrive at the coin transfer cutaway portion 20 from which they are delivered forth onto the coin passage 41. Because the coin passage 41 is formed by the coin guide plate 42 and the diameter adjuster 44, tangentially of the disc 4, the coins are delivered smoothly with hardly any resistance to their movement. In addition, since the width of the coin passage 41 is adjusted to conform with the diameter of the coins by means of the adjuster 44, the coins are conducted along without any sidewise play. The coins which have been delivered onto the coin passage 41 are conveyed to the front by being pressed by the drive belt 54. While being so conveyed, the coins come into engagement one by one with the concave portions 77 of the star wheel 76 protruding into the coin passage 41 and turn the star wheel, which makes one complete rotation upon the passage of five coins. When the star wheel 76 makes one rotation, the finger 80a of the actuating disc 80 engages with a tooth of the ratchet wheel 81 to turn the latter an amount equal to one tooth segment. In wrapping a predetermined number of coins, say 50 coins, when the ratchet wheel 81 rotates through an angle equal to ten segments of the teeth of the wheel by the engagement of the finger 80a of the actuating disc 80 ten times as a result of the passage of 50 coins, the pin 83 of the ratchet wheel 81 comes into engagement with the lock cam 84. Then as a result of the engaging action of the lock cam 84 with the lock lever 89, the lock plate 93 pivoted on the lock lever 89 advances to position 93′ and the distal portion of this lock plate 93 engages the pin 79 of the actuating disc 80, with the consequence that the rotation of the shaft 78 is stopped and thus the movement of the coins along the coin passage 41 is also stopped. When the lock cam 84 arrives at position 84′, the microswitch 113 is opened and the solenoid 74 is de-energized. As a result, the coupled engagement of the clutch member 64 and the pulley 61 is released and the operation of the drive belt 54 ceases. At this time, the position of the pawl 103 shifts to 103′ by the action of the lock cam 84 via the link 102 and thus the pawl 103 becomes disengaged from the ratchet wheel 81, with the consequence that the latter is rotated back towards its starting position by means of the spiral spring 97 to be restored to its prescribed position by means of the engagement of the pin 101 of the ratchet wheel 81 with the start adjuster 99. The coins which have been delivered from the coin passage 41 by means of the aforesaid drive belt 54 drop by means of gravity along the inclined guiding surface 142 of the outlet 140 which opens at the front end of the coin passage 41 to be conducted into the coin receiving hole 147 of the coin receiver 145. The receiving hole 147 of the coin receiver 145 is provided in advance with a coin wrapper 188, which is inserted manually from the bottom of the hole and held therein. The coins are stacked horizontally in the coin receiving hole 147. When the coin wrapper 188, after it has been filled with the predetermined number of coins, is manually pressed upwardly into the opening 171 formed by the supporting members 169 of the disc 161 which is being rotated, the rim at the upper open end of the wrapper 188 is crimped inwardly by means of the end 182 at the distal portion of the crimping hook 172, thus completing the wrapping of the stacked coins by their being held with the crimped retaining portion 183 of the wrapper 188. Because the opening 171 formed by the supporting members 169 is adjusted to conform with the diameter of the coin being handled, the sides of the stacked coins are held by the supporting members 169 and the crimping operation is easily carried out to ensure a tight package. Next, by closing the starting switch 116 the delivery of the coins is started again and the hereinbefore described operation is repeated. Thus, the predetermined number of coins can be stacked and wrapped in the coin wrappers 188, it being possible to carry out this operation continuously with coins of varied denominations having differing diameters and thicknesses.

I claim:

1. A coin handling apparatus comprising, in combination, a coin transfer device; a coin counting device operably associated with said coin transfer device and counting by groups the number of coins transferred by the transfer device, each group containing the same number of coins, said coin counting device stopping when a predetermined number of groups of coins have been counted; a coin receiving device having coin wrapper tube holding means and receiving the predetermined number of coins from the coin transfer device and feeding them into a wrapper; and a coin wrapper crimping device mounted on said apparatus for crimping the filled coin wrapper; said wrapper crimping device including at least two supporting members radially equidistantly spaced from a center and simultaneously movable radially relative to said center, said supporting members having the inner sides thereof curved concavely and arcuately, at least one of said supporting members having thereon a crimping hook having a downwardly bent distal portion protruding from said arcuately curved inner side into an opening defined by said supporting members and having a concavely curved surface spaced from and opposed to said inner side; means coupled to said coin transfer device for rotating said coin transfer device; and means coupled to said coin wrapper crimping device for rotating said coin wrapper crimping device around said center as an axis; whereby when a coin wrapper filled with coins by the coin receiving device is inserted into the space defined by the revolving supporting members of the coin wrapper crimping device, the rim of the coin wrapper tube is crimped inwardly by means of the curved surface of said crimping hook.

2. A coin handling apparatus comprising, in combination, a coin transfer device; a coin counting device operably associated with said coin transfer device and counting by groups the number of coins transferred by the transfer device, each group containing the same number of coins, said coin counting device stopping when a predetermined number of groups of coins have been counted; a coin receiving device receiving the predetermined number of coins from the coin transfer device and feeding them into a wrapper, said coin receiving device comprising a rotating member having a plurality of individual coin wrapper holding members thereon disposed with the centers of the several individual members positioned on substantially the same circumference, said rotating member being rotatable about the center of said circumference so that said individual members can be moved to a position below the discharge end of said coin transfer device, said individual members having holes therein of different diameters so as to be capable of receiving therein coins having different diameters, and a stop means engageable with said rotating member for preventing the unintentional rotation of said rotating member when one of said individual members is positioned below said discharge end; and a coin wrapper crimping device comprising at least two supporting members radially equidistantly spaced from a center and simultaneously movable radially relative to said center, said supporting members having the inner sides thereof curved concavely and arcuately, at least one of said supporting members having thereon a crimping hook having a downwardly bent distal portion protruding from said arcuately curved inner side into an opening defined by said supporting members, means coupled to said coin transfer device for rotating said coin transfer device; and means coupled to said coin wrapper crimping device for rotating said coin wrapper crimping device around said center as an axis.

3. A coin handling apparatus comprising, in combination, a coin transfer device, said coin transfer device comprising a disc for transferring the coins, a fixed guide ring with a portion thereof cut away, said ring being disposed around the periphery of said disc, a coin guide plate means defining a passage disposed tangentially of said disc at said cut-away portion of said guide ring for guiding the coins discharged in a tangential direction from said disc through said cut-away portion, means connected to said guide plate means for moving a part of said guide plate means for adjusting the width of said coin passage, and coin moving means extending along said passage for transferring the coins along said passage at a prescribed speed; a coin counting device operably associated with said coin transfer device and counting by groups the number of coins transferred by the transfer device, each group containing the same number of coins, said coin counting device stopping when a predetermined number of groups of coins have been counted; a coin receiving device receiving the predetermined number of coins from the coin transfer device and feeding them into a wrapper, and a coin wrapper crimping device comprising at least two supporting members radially equidistantly spaced from a center and simultaneously movable radially relative to said center, said supporting members having the inner sides thereof curved concavely and arcuately, at least one of said supporting members having thereon a crimping hook having a downwardly bent distal portion protruding from said arcuately curved inner side into an opening defined by said supporting members, means coupled to said coin transfer device for rotating said coin transfer device; and means coupled to said coin wrapper crimping device for rotating said coin wrapper crimping device around said center as an axis.

4. A coin handling apparatus comprising, in combination, a coin transfer device, said coin transfer device comprising a disc, a cylindrical rim around said disc, said rim and the peripheral edge of said disc being spaced to leave a gap therebetween for arranging and guiding the coins tangentially of the disc, said cylindrical rim being adjustable toward and away from the disc for adjusting gradually the gap between it and the whole peripheral edge of the disc in accordance with the thickness of the coins handled; said coin transfer device and counting by groups the number of coins transferred by the transfer device, each group containing the same number of coins, said coin counting device stopping when a predetermined number of groups of coins have been counted; a coin receiving device receiving the predetermined number of coins from the coin transfer device and feeding them into a wrapper, and a coin wrapper crimping device comprising at least two supporting members radially equidistantly spaced from a center and simultaneously movable relative to said center, said supporting members having the inner sides thereof curved concavely and arcuately, at least one of said supporting members having thereon a crimping hook having a downwardly bent distal portion protruding from said arcuately curved inner side into an opening defined by said supporting members, means coupled to said coin transfer device for rotating said coin transfer device; and means coupled to said coin wrapper crimping device for rotating said coin wrapper crimping device around said center as an axis.

5. A coin handling apparatus comprising, in combination, a coin transfer device comprising a disc, a coin passage disposed tangentially of said disc, and coin transfer means along said coin passage transferring coins along said passage from said disc; a coin counting device counting by groups the number of coins transferred by the transfer device each group containing the same number of coins, said counting device stopping when a predetermined number of groups of coins have been counted, said counting device including a star wheel protruding into said passage and rotated an amount equal to one tooth segment thereof with the passage of each coin by said wheel, a ratchet wheel coupled to and rotated by said star wheel, said ratchet wheel being rotated an angle corresponding to a predetermined number of coins, a start adjustor coupled to said ratchet wheel and rotating said wheel so that it is capable of starting from any predetermined starting position around its entire periphery corresponding to the number of coins to be counted; said counting device further including means coupled to said ratchet wheel for blocking rotation of said star wheel and stopping the transfer of the coin when the predetermined number of coins have been counted; a coin receiving device receiving the predetermined number of coins from the coin transfer device and feeding them into a wrapper; and a coin wrapper crimping device comprising at least two supporting members radially equidistantly spaced from a center and simultaneously movable radially relative to said center, said supporting members having the inner sides thereof curved concavely and arcuately, at least one of said supporting members having thereon a crimping hook having a downwardly bent distal portion protruding from said arcuately curved inner side into an opening defined by said supporting members, means coupled to said coin transfer device for rotating said coin transfer device; and means coupled to said wrapper crimping device for rotating said coin wrapper crimping device around said center as an axis.

6. A coin handling apparatus as claimed in claim 5 wherein said coin counting device includes an electric control circuit having switch means which, at the time of the start of each cycle of count is temporarily closed, electrically actuated means coupled to said ratchet wheel and controlled by said switch for disengaging said ratchet wheel from blocking means and permitting the rotation thereof, relay holding means in said circuit and a starting switch for closing said circuit, whereby even though said starting switch is pressed continuously, said disengagement does not occur after completion of one operating cycle.

References Cited
UNITED STATES PATENTS

| 1,750,578 | 3/1930 | Downey | 133—8 |
| 1,805,079 | 5/1931 | Donnellan | 133—8 |
| 1,952,563 | 3/1934 | Myers | 133—8 |
| 3,253,604 | 5/1966 | Read | 53—159 |

WILLIAM W. DYER, JR., *Primary Examiner.*

G. Y. CUSTER, JR., *Examiner.*